United States Patent
Stenbratt et al.

(10) Patent No.: US 12,358,576 B2
(45) Date of Patent: Jul. 15, 2025

(54) SELF-POWERED SINGLE AXLE DOLLY VEHICLE UNIT WITH AUTO-COUPLING ABILITY

(71) Applicant: VOLVO TRUCK CORPORATION, Gothenburg (SE)

(72) Inventors: Ulf Stenbratt, Vallda (SE); Leo Laine, Härryda (SE); Joao Mendonca, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 886 days.

(21) Appl. No.: 17/452,909

(22) Filed: Oct. 29, 2021

(65) Prior Publication Data
US 2022/0144355 A1    May 12, 2022

(30) Foreign Application Priority Data
Nov. 6, 2020  (EP) ..................... 20206233

(51) Int. Cl.
*B62D 53/08*    (2006.01)
*B60L 15/38*    (2006.01)
(Continued)

(52) U.S. Cl.
CPC .......... *B62D 53/0864* (2013.01); *B60L 15/38* (2013.01); *B62D 13/06* (2013.01); *B62D 59/04* (2013.01); *B60L 2200/28* (2013.01)

(58) Field of Classification Search
CPC ............ B62D 53/0864; B62D 53/0857; B62D 53/0821; B62D 59/02; B62D 59/04; B62D 13/06; B60L 15/38; B60L 2200/28
(Continued)

(56) References Cited

U.S. PATENT DOCUMENTS

| | | | | |
|---|---|---|---|---|
| 5,284,356 A | * | 2/1994 | Heider | ............... B62D 53/0864 280/438.1 |
| 9,694,790 B2 | * | 7/2017 | Kimener | ................... B60S 9/20 |

(Continued)

FOREIGN PATENT DOCUMENTS

| EP | 1177971 A1 | 2/2002 |
|---|---|---|
| EP | 3290305 A1 | 3/2018 |

(Continued)

OTHER PUBLICATIONS

European Search Report dated Apr. 14, 2021 in corresponding European Patent Application No. 20206233.7, 9 pages.

(Continued)

*Primary Examiner* — Anne Marie M Boehler
(74) *Attorney, Agent, or Firm* — Venable LLP; Jeffri A. Kaminski

(57) ABSTRACT

A single axle dolly vehicle unit for a heavy duty vehicle combination, the dolly vehicle unit comprising an electrical energy source arranged to power at least one electric machine configured to drive left and right wheels of the single axle, the dolly vehicle unit further comprising a drawbar and a fifth wheel connection for mating with first and second trailer units, respectively, wherein the fifth wheel connection is arranged to be adjusted in height over ground by a variable height suspension system, the dolly vehicle unit further comprising a control unit arranged to control the variable height suspension system.

22 Claims, 7 Drawing Sheets

(51) Int. Cl.
  *B62D 13/06* (2006.01)
  *B62D 59/04* (2006.01)
(58) Field of Classification Search
  USPC ........................................................ 280/476.1
  See application file for complete search history.

(56) References Cited

U.S. PATENT DOCUMENTS

| | | | | |
|---|---|---|---|---|
| 11,833,924 | B2* | 12/2023 | Layfield | .............. B60L 15/2036 |
| 2007/0040353 | A1 | 2/2007 | Dallaire et al. | |
| 2010/0084836 | A1* | 4/2010 | Cockram | ............... B62D 55/08 |
| | | | | 280/433 |
| 2014/0015223 | A1 | 1/2014 | Banwart | |
| 2014/0246257 | A1* | 9/2014 | Jacobsen | ................. F41H 7/005 |
| | | | | 180/14.2 |
| 2015/0102583 | A1* | 4/2015 | Reimer | .................. B60D 1/015 |
| | | | | 280/433 |
| 2019/0233034 | A1* | 8/2019 | Viele | ........................ B60D 1/36 |
| 2019/0385461 | A1* | 12/2019 | Blomstrand | ........... B60D 1/481 |
| 2020/0164918 | A1* | 5/2020 | Newton | .............. B66F 9/07568 |
| 2020/0233410 | A1 | 7/2020 | Burns et al. | |
| 2021/0114422 | A1* | 4/2021 | Goodarzi | ................. B60D 1/24 |
| 2022/0017161 | A1* | 1/2022 | Layfield | ............... B60K 7/0007 |
| 2022/0041069 | A1* | 2/2022 | Layfield | .................... B60L 7/10 |

FOREIGN PATENT DOCUMENTS

| | | | | |
|---|---|---|---|---|
| EP | | 3398842 A1 | 11/2018 | |
| JP | | 6286053 B2 | 2/2018 | |
| WO | WO-2015042169 A1 * | | 3/2015 | ............... B60S 9/08 |
| WO | WO-2018162030 A1 * | | 9/2018 | ............ B60D 1/155 |
| WO | | 2020109545 A1 | 6/2020 | |

OTHER PUBLICATIONS

European Communication Pursuant to Article 94(3) dated Aug. 25, 2023 in corresponding European Patent Application No. 20206233. 7, 7 pages.

* cited by examiner

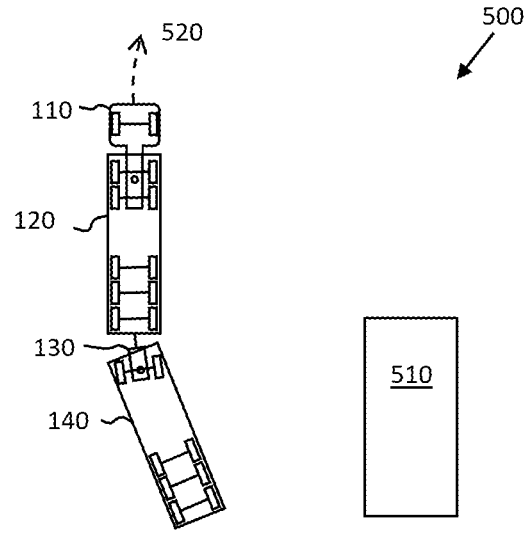
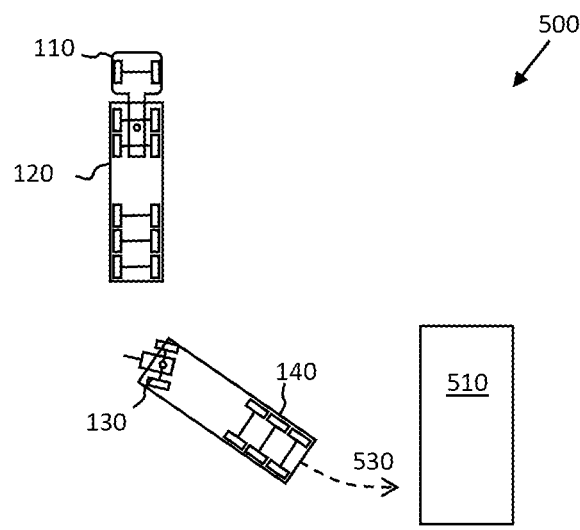
FIG. 5A  FIG. 5B
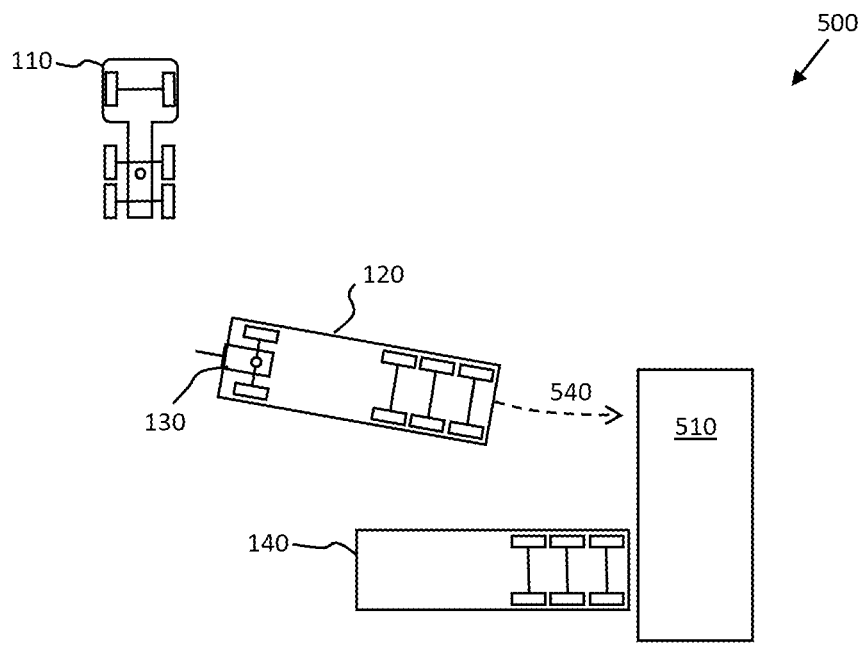
FIG. 5C

SELF-POWERED SINGLE AXLE DOLLY VEHICLE UNIT WITH AUTO-COUPLING ABILITY

TECHNICAL FIELD

The present disclosure relates to heavy-duty vehicles such as semi-trailer vehicles for cargo transport, and in particular to self-powered dolly vehicles comprising an energy source configured to power various dolly vehicle functions such as steering, propulsion and braking. Although the invention will be described mainly with respect to semi-trailer vehicles and trucks, the invention is not restricted to this particular type of vehicle but may also be used in other types of vehicles.

BACKGROUND

A semitrailer vehicle normally comprises a tractor arranged to tow a trailer unit via a fifth wheel connection. In order to extend the cargo transport ability of the semitrailer vehicle, a dolly vehicle unit can be added to the vehicle combination, which allows for additional trailer units to be towed by the same tractor. A traditional dolly is an unpowered vehicle unit designed for connection to a tractor unit, truck, or prime mover vehicle with strong traction power.

Dolly vehicles comprising on-board energy sources such as electric machines and dolly vehicles with one or more steered axles have recently been proposed. Such dolly vehicles can provide additional power to the vehicle combination, thus reducing the traction power requirements imposed on the prime mover vehicle. Electrified dolly vehicles may also reduce overall fuel consumption by the vehicle combination, since they provide a degree of hybridization to conventional diesel-engine powered tractors. Steered axle dolly vehicles may furthermore be used for improved steering of the vehicle combination, e.g., when negotiating sharp curves.

US 10,518,831 B2 relates to self-powered steerable dolly vehicles. Methods for controlling the dolly vehicles in order to, e.g., negotiate sharp turns, are disclosed. Methods for controlling propulsion and regenerative braking operations in dependence of an upcoming vehicle route to be travelled by the dolly vehicle are also discussed.

WO 2020/142829 A1 discloses a self-powered single axle dolly vehicle unit for optimizing fuel efficiency of a cargo transport vehicle. There is also disclosed remote controls for manoeuvring the single-axle dolly vehicle during, e.g., coupling procedures.

However, there is a need for further development and optimization of self-powered dolly vehicles in order to improve handling and overall vehicle performance in various situations.

SUMMARY

It is an object of the present disclosure to provide self-powered single axle dolly vehicle units and also full trailer vehicle units which alleviate at least some of the above-mentioned issues.

This object is at least in part achieved by a single axle dolly vehicle unit for a heavy duty vehicle combination. The dolly vehicle unit comprises an electrical energy source arranged to power at least one electric machine configured to drive left and right wheels of the single axle. The dolly vehicle unit further comprises a drawbar and a fifth wheel connection for mating with first and second trailer units, respectively, wherein the fifth wheel connection is arranged to be adjusted in height over ground by a variable height suspension system. The dolly vehicle unit further comprises a control unit arranged to control the variable height suspension system in response to a control signal.

This single axle dolly vehicle unit simplifies the otherwise complex and time consuming coupling procedure and can at the same time improve fuel efficiency of the heavy duty vehicle combination.

The control unit may obtain the control signal from a manual input device used during a manual coupling procedure, or as part of an autonomous or a semi-autonomous auto-coupling procedure. The control signal may also be received from a remote location, e.g., via a wireless access network or the like.

According to some aspects, the control unit is arranged to perform an auto-coupling procedure with the second trailer unit. This auto-coupling procedure comprises adjustment of the height over ground of the suspension system to mate the fifth wheel connection with a kingpin of the second trailer unit. This way the auto-coupling procedure is enabled without manual configuration of the height over ground of the single axle dolly vehicle unit.

According to aspects, the drawbar is supported by a supporting member arranged to be adjusted in height over ground by the control unit. This way the height over ground of the drawbar can also be controlled in a convenient manner, either by manual control input to the control unit or as part of an autonomous or semi-autonomous coupling procedure.

According to some aspects, the supporting member comprises a swiveling or fixed wheel on one end and a folding joint on an opposite end from the wheel. The supporting member is arranged foldable about the folding joint. This arrangement is similar to that of the landing gear of an airplane. It provides an efficient means to stow the supporting member in an efficient and safe manner when it is not needed. The supporting member can also be used to adjust height over ground by varying the extent to which the supporting member is folded out from the stow-away position.

According to some aspects, the control unit is arranged to detect a height over ground of the kingpin of the second trailer unit using any of an optical sensor and a radar sensor. These sensors allows the control unit to configure the height over ground for coupling without requiring manual input, which is an advantage.

According to some other aspects, the control unit is arranged to obtain information indicative of the height over ground of the kingpin of the second trailer unit from a remote server or from an on-board memory device. Thus, a suitable height over ground can be pre-configured in memory or at the remote server. This information can, e.g., be configured in dependence of a geographical location or in dependence of a particular type of equipment, thus further facilitating convenient coupling involving the dolly vehicle unit.

The energy source can, for instance, comprise any of a battery, a super-capacitor, or a fuel cell. According to some aspects, the energy source is placed in front of an electric axle of the electric machine. This way the energy source can be supported by a supporting member arranged to hold the drawbar off the ground when the dolly vehicle is not coupled. However, the energy source can also be placed to the rear of an electric axle of the electric machine, which may provide a better weight balance for some dolly vehicle designs.

According to aspects, the single axle dolly vehicle unit is arranged to be remote controlled via a wireless link to a wireless device. This way, an operator can control the dolly vehicle unit remotely from a wireless device such as a smartphone or other type of remote control. This facilitates the coupling procedure, and also provides for a more safe coupling procedure since the operator can control the coupling procedure from a safe location.

According to aspects, the single axle dolly vehicle unit comprises one or more camera units and a radio transceiver arranged to feed a live video stream to a remote location. This enables remote control of the dolly vehicle unit from the remote location, which is an advantage, since coupling can be performed without personnel on site, and without requiring autonomous operation. For instance, the single axle dolly vehicle unit can be arranged to be remote controlled via a wireless link to a radio base station. Thus, the dolly vehicle unit can be integrated into a cellular access network and thereby be controlled from a distance. An operator may receive a data stream comprising, e.g., live video, from the dolly vehicle unit and control the dolly vehicle unit to perform a coupling operation from a location several miles away.

The control unit may be arranged to steer the dolly vehicle unit via control of at least two separate electric machines configured to drive the left and right wheel, or via control of friction brakes on each wheel, potentially in combination with a differential drive. At least one electric machine may be an in-hub wheel motor which does not require a lot of space in the frame to be mounted. The control unit may furthermore perform yaw stability control by torque vectoring using the electric machines and/or other motion support devices on the dolly vehicle unit, such as friction brakes.

The single axle dolly vehicle unit can be any of an A-dolly type or a C-dolly type.

There is also disclosed herein a full trailer vehicle unit for a heavy duty vehicle combination. The vehicle unit comprises an electrical energy source arranged to power at least one electric machine configured to drive left and right wheels of a front axle of the full trailer vehicle unit. The full trailer vehicle unit further comprises a drawbar for mating with a truck, wherein the full trailer vehicle unit is arranged to be adjusted in height over ground by a variable height suspension system, the full trailer vehicle unit further comprising a control unit arranged to control the variable height suspension system in response to a control signal. It is appreciated that the features discussed above in connection to the dolly vehicle unit can also be applied in a full trailer vehicle unit, where the front axle of the full trailer vehicle unit corresponds to the single axle on the dolly vehicle unit.

There is also disclosed herein methods and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIGS. 5A-C illustrates a decoupling procedure involving a self-powered dolly vehicle unit.

DETAILED DESCRIPTION OF EXAMPLE EMBODIMENTS OF THE INVENTION

Figure 1A:
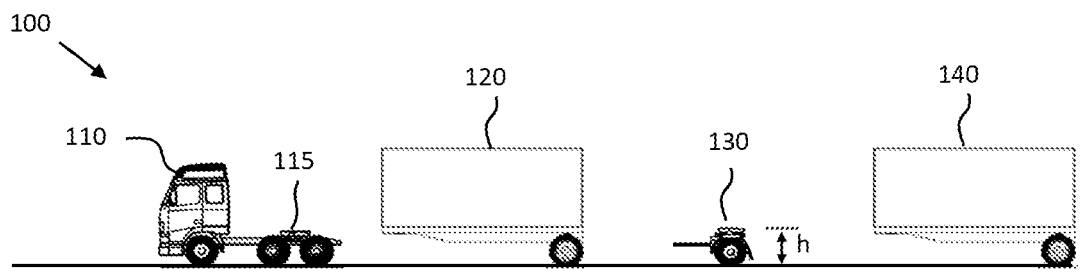
FIGS. 1A-B show example vehicle combinations.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1A illustrates an example vehicle combination 100 for cargo transport. The vehicle combination 100 comprises a truck or towing vehicle 110 configured to tow a first trailer unit 120 in a known manner, e.g., by a fifth wheel connection 115. To extend the cargo transport capability of the vehicle combination 100, a dolly vehicle 130 can be connected to the rear of the first trailer 120 via a drawbar. This dolly vehicle can then tow a second trailer 140, thus increasing the cargo transport capacity of the vehicle combination.

A dolly vehicle 130 is traditionally a passive vehicle comprising no driven or steerable axles, and with a relatively short wheelbase. It has recently been shown that self-powered dolly vehicles may provide both increased fuel efficiency and maneuverability. This type of self-powered dolly vehicle comprises an on-board energy source, such as a battery, super-capacitor or a fuel cell stack, and at least one pair of driven wheels. Some self-powered dolly vehicles may also be steerable.

Increased fuel efficiency is for instance obtained if an electric machine arranged for regenerative braking is installed in the dolly vehicle. The vehicle combination then effectively becomes a hybrid electric vehicle, even if the towing vehicle only comprises a traditional diesel engine with no on-board electric hybridization. An example of this type of self-powered dolly vehicle will be discussed in more detail below in connection to, e.g., FIGS. 2A and 2B.

Adding a self-powered dolly vehicle 130 to the vehicle combination 100 can also improve startability, since the dolly vehicle is then able to generate extra torque when bringing the vehicle combination into motion from a standstill. Vehicle startability may be a limiting factor in the maximum load possible to carry, and a self-powered dolly vehicle may therefore contribute to an increased cargo capacity, which is an advantage.

Both the truck 110 and the self-powered steerable dolly vehicle 130 may comprise electric machines for propulsion and/or regenerative brakes for decelerating the vehicle unit while harvesting energy. The self-powered vehicle units also comprise respective energy sources. An energy source is normally a battery, super-capacitor, fuel cell or other device arranged to store electrical energy. However, an energy source may also comprise mechanical energy storage devices such as springs and compressed air tanks for pneumatic machines. Combinations of different types of energy sources can also be used. A traditional fuel tank for storing gasoline or diesel fuel can of course also be considered an energy source in this context. The present disclosure, however, focuses on propulsion arrangements based on electric machines powered by an electrical energy storage device, such as a battery or a fuel cell stack.

Figure 1B:
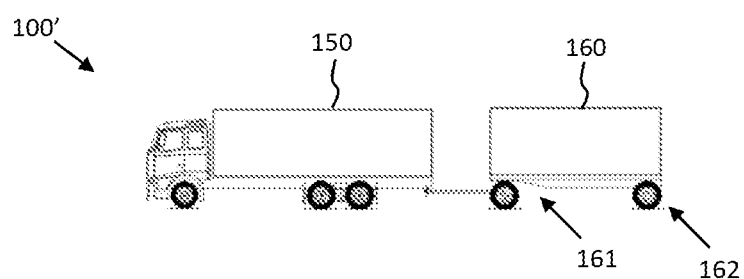

The teachings herein can also be applied to other vehicle combinations, and in particular to so-called truck and full trailer combinations 100', illustrated in FIG. 1B. These vehicles comprise a truck 150 arranged to tow a full trailer unit 160. A full trailer unit is a trailer which is able to fully support itself on the ground, i.e., it comprises both front 161 and rear 162 trailer axles. The front axle 161 can be self-powered and also steerable just like that of the dolly vehicle unit 130. Thus, most if not all of the techniques, devices and methods discussed herein are also applicable to full trailer units like that shown in FIG. 1B.

Figure 2A:
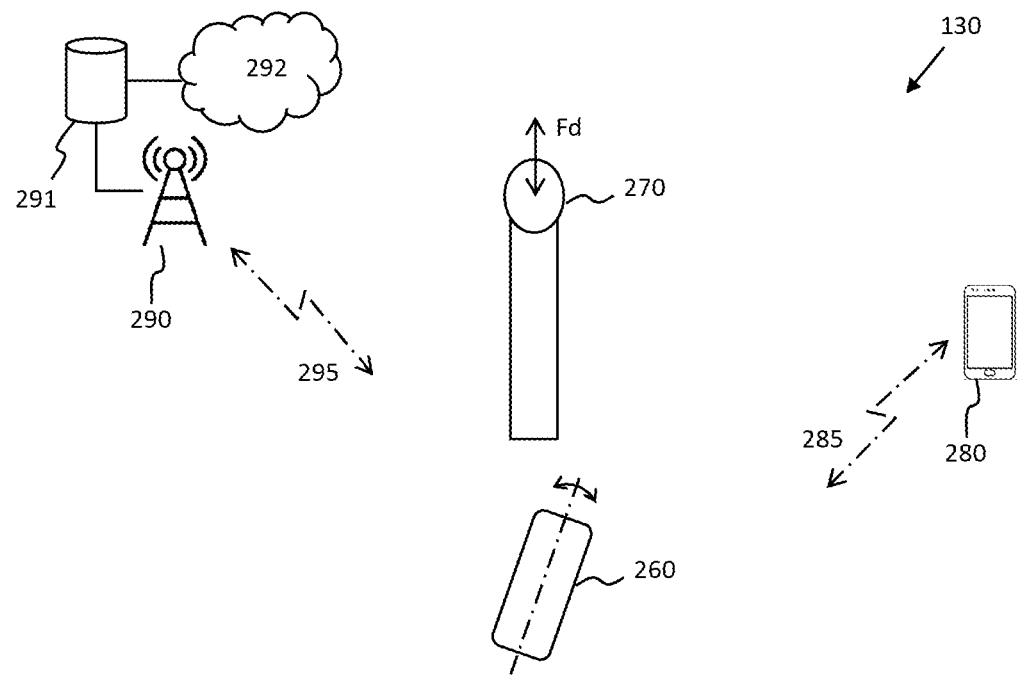
FIGS. 2A-B illustrate example vehicle units.
Figure 2A:
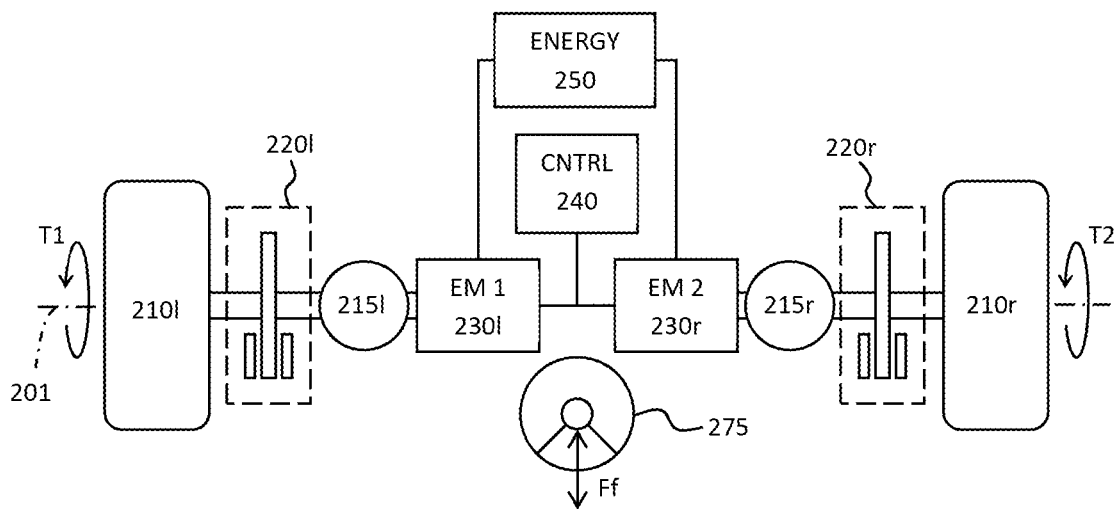
Figure 2B:
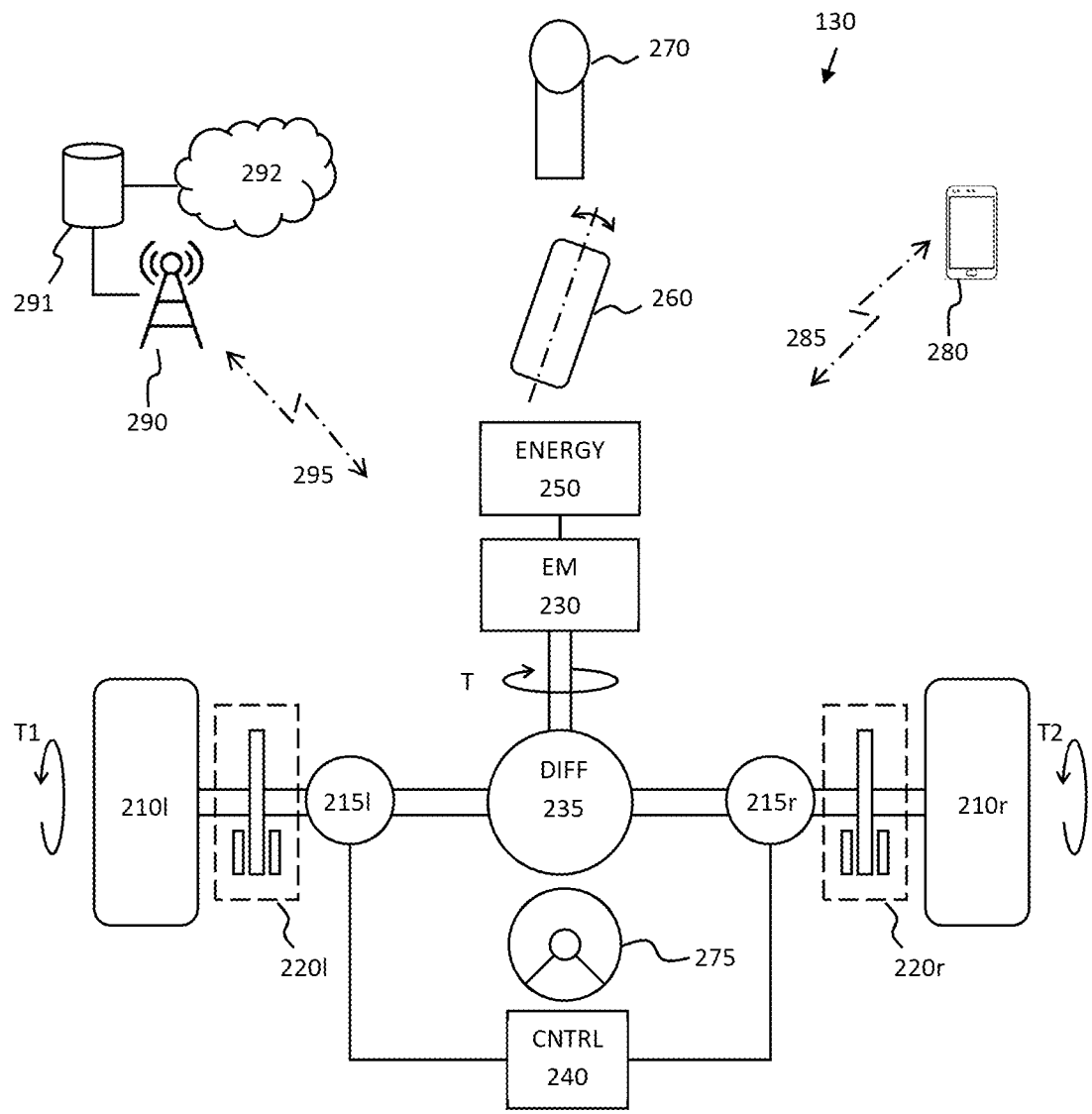

FIGS. 2A and 2B schematically illustrate example dolly vehicle units 130 for use with heavy duty vehicles such as discussed above in connection to FIGS. 1A and 1B. The dolly vehicle units comprise a single axle 201 with left- and right-hand side driven wheels 210*l*, 210*r*, as well as a fifth wheel connection 275 and a drawbar 270. The dolly vehicle 130 is self-powered by a propulsion arrangement. The example dolly vehicle unit 130 shown in FIG. 2A comprises a propulsion arrangement comprising an energy source 250 connected to two electrical machines 230*l*, 230*r* which each drive one of the left and right wheels 210*l*, 210*r*. The example dolly vehicle unit 130 shown in FIG. 2B comprises a propulsion arrangement also comprising an energy source 250, connected to a single electrical machine 230, which in turn powers the left and right wheels 210*l*, 210*r* via a differential 235.

It is appreciated that the arrangements shown in FIGS. 2A and 2B are also applicable to the front axle of a full trailer vehicle unit 160.

Herein, a heavy-duty vehicle is taken to be a vehicle designed for the handling and transport of heavier objects or large quantities of cargo. As an example, a heavy-duty vehicle could be a semi-trailer vehicle or a truck. As another example, a heavy-duty vehicle could be a vehicle designed for use in construction or farming.

The dolly vehicle unit 130 further comprises a drawbar 270 and a fifth wheel connection 275 for mating with first 120 and second 140 trailer units, respectively. The dolly vehicle unit 130 is arranged to be connected to a truck or towing trailer unit via the drawbar 270. This connection is associated with a longitudinal force Fd. The force Fd will be positive, i.e., an accelerating pull force acting on the dolly in case the vehicle combination is accelerating, and a negative force, i.e., a braking force, in case the vehicle combination is slowing down. A similar force Ff will be generated at the fifth wheel connection 275 in the longitudinal direction of the dolly.

The fifth wheel connection 275 is arranged to be adjusted in height over ground h by a variable height suspension system 215*l*, 215*r*. The dolly vehicle unit 130 further comprises a control unit 240 arranged to control the variable height suspension system 215*l*, 215*r*, and to perform an auto-coupling procedure 400 with the second trailer unit 140. The auto-coupling procedure comprises adjustment of the height over ground h of the suspension system 215*l*, 215*r* to mate the fifth wheel connection 275 with a kingpin of the second trailer unit 140.

The height h of the fifth wheel connection 275 is here taken to be the substantially vertical distance from the ground on which the wheels 210*l*, 210*r* of the dolly vehicle unit 130 is standing to the top of the fifth wheel connection 275.

According to one example, a variable height suspension system may be an air suspension system comprising a compressor arranged to pump air into flexible bellows, thereby raising the height of the suspension. According to another example, a variable height suspension system may be a hydropneumatic suspension system arranged to increase or decrease the pressure of a gas or a liquid, thereby raising or lowering the vehicle. According to a third example, a variable height suspension system may be an electrical suspension system comprising at least one electronic actuator arranged to adjust the height of the suspension system. Optionally, an electronic actuator may be an electric suspension motor.

The control unit 240 can also be configured to control various functions on the dolly, such as generated torque by the propulsion arrangement, braking, steering, and so on. This control unit will be discussed in more detail below in connection to FIG. 8.

On the abovementioned single axle dolly vehicle unit 130, the drawbar 270 may be supported by a supporting member 260. This supporting member 260 may be arranged to be adjusted in height over ground by the control unit 240. A supporting member 260 is a member arranged to keep the drawbar 270 from resting on the ground when the single axle dolly vehicle unit 130 is not mated with a first trailer unit 120 by means of the drawbar 270. The possibility of adjusting the height over ground of the supporting member 260 facilitates mating the dolly vehicle unit 130 with a first trailer unit 120 by means of the drawbar 270, as it means that the height of the drawbar 270 can be adjusted to match the height over ground of the first trailer unit 120. The height over ground of the supporting member 260 may for example be adjusted through the use of a linear actuator, optionally an electric actuator. Here, the height over ground of the supporting member 260 is taken to be the vertical distance to the ground from the point of contact between the supporting member 260 and the drawbar 270. The supporting member preferably comprises a wheel on the distal end. This way the dolly vehicle unit 130 can be maneuvered by means of the propulsion arrangement without the drawbar scraping against ground.

Figure 3:
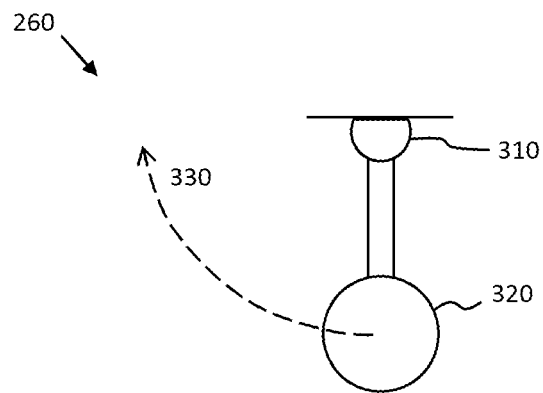
FIG. 3 schematically illustrates a supporting member.

FIG. 3 shows an example of a supporting member 260, where the supporting member 260 comprises a swiveling wheel 320 on one end and a folding joint 310 on an opposite end from the wheel 320. The supporting member is arranged foldable 330 about the folding joint 310.

The swiveling wheel 320 enables the supporting member 260 to be used during maneuvering of the single axle dolly vehicle unit 130 in situations where it is not mated with a first trailer unit 120. An example of such maneuvering could be to maneuver the single axle dolly vehicle unit 130 into position for mating with a first or second trailer unit 120, 140.

When the single axle dolly vehicle unit 130 is mated with a first trailer unit 120 by means of the drawbar 270, the supporting member 260 can be folded using the folding joint 310. As an example, it can be folded to lie parallel to the drawbar 270, in which position the swiveling wheel 320 is no longer in contact with the ground. This has the advantage of ensuring that the supporting member 260 does not impede maneuvering of the vehicle combination 100 comprising the single axle dolly vehicle unit 130.

Of course, a fixed wheel can be used instead of the swiveling wheel with almost the same effect. The wheel is then locked to roll in the longitudinal direction of the dolly vehicle unit.

Figure 6:
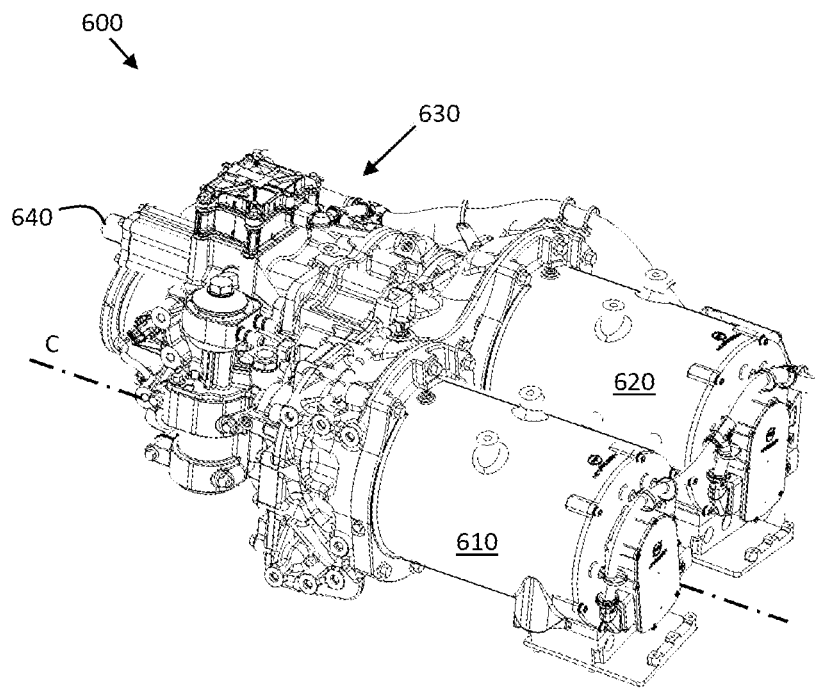
FIG. 6 shows an example electric propulsion arrangement for a dolly vehicle.

FIG. 6 shows an example of a dolly vehicle propulsion module, where first and second electric machines 610, 620 and a gearbox 630 have been integrally formed as a single module. The two electric machines 610, 620 are arranged on either side of a longitudinal centrum line C of the module, where they interface with the gearbox 630. An output shaft 640 of the gearbox can be seen extending in a direction aligned with the centrum line C. This integrally formed module conserves space and simplifies dolly vehicle unit assembly. This is an advantage since space is limited in the relatively small dolly vehicle unit. The output shaft can be connected to the driven wheels on the dolly via a differential, such as the differential 235 shown in FIG. 2B.

The control unit 240 may be arranged to detect a height over ground of the kingpin of the second trailer unit 140 using an optical sensor. An optical sensor may for example be a camera, a stereo camera comprising at least two component cameras, or a LIDAR sensor.

The control unit 240 may be arranged to apply image processing techniques to the output from a camera or stereo camera in order to detect the height over ground of the kingpin of the second trailer unit 140. Image processing techniques may comprise finding a contour of one or more objects in the image and determining the height of one or more object based on the number of image pixels it occupies. Optionally, the control unit 240 may be arranged to identify in the camera output one or more markers of a known size on the second trailer unit 140. These one or more markers may be used e.g. to facilitate identification of the second trailer unit 140 in the image, to determine a distance to the trailer, and/or to facilitate determining the height over ground of the kingpin by using the marker as a reference for object size. The markers may be arranged, e.g., as stickers which an operator can manually deploy on a passive trailer unit in order to enable autocoupling by the dolly vehicle unit 130. For instance, a marker can be placed on the front face of a trailer and aligned with the kingpin. This marker can then be used when maneuvering the dolly vehicle into coupling position.

For a stereo camera, image processing may also comprise identifying an object in the output from both component cameras and determining a distance to the object and a height of the object based on a known distance between the component cameras. Image processing techniques are known in the art.

The control unit 240 may also be arranged to apply point cloud processing algorithms to the output from a LIDAR sensor in order to detect the height over ground of the kingpin of the second trailer unit 140. Point cloud processing may comprise segmenting the point cloud into groups of points representing one or more objects and determining the size of said objects. Point cloud processing algorithms are known in the art and will therefore not be discussed in more detail herein.

The control unit 240 may also be arranged to detect a height over ground of the kingpin of the second trailer unit 140 using a radar sensor. The control unit 240 may be arranged to apply algorithms for processing a point cloud to the input from the radar sensor. Point cloud processing may comprise segmenting the point cloud into groups of points representing one or more objects and determining the size of said objects. The radar transceiver device may also be arranged on or in connection to the kingpin. The radar transceiver may be detected by the control unit 240 and the return signal from the radar transceiver may be used by the control unit 240 when maneuvering the dolly vehicle into coupling position.

Optionally, the control unit 240 may be arranged to detect a height over ground of the kingpin of the second trailer unit 140 using a combination of different sensors, such as radar and camera or ultrasound and camera. As an example, a radar or ultrasound sensor could be used to determine a distance to the kingpin of the second trailer unit 140, and a camera sensor could be used to determine the height of the kingpin of the second trailer unit 140 based on the dimensions of the kingpin in the camera output and the distance to the kingpin.

According to aspects, the control unit 240 may be arranged to detect a height over ground of the kingpin of the second trailer unit 140 by applying a trained machine learning model to the output from one or more sensors. The sensors may be cameras, stereo cameras, LIDAR sensors or radar sensors.

The control unit may also be arranged to obtain information indicative of the height over ground of the kingpin of the second trailer unit 140 from the remote server 291 or from an on-board memory device 830.

At least some of the dolly vehicle units 130 discussed herein comprise a control unit 240 arranged to perform an auto-coupling procedure. In short, this auto-coupling procedure comprises establishing a path for maneuvering the dolly vehicle into coupling position with a trailer, maneuvering the dolly vehicle unit 130 along the path using the propulsion arrangement, and then performing a mating operation to mate the coupling means on the dolly vehicle unit 130, i.e., the drawbar 270 or the fifth wheel connection 275, with corresponding coupling means on the trailer unit. This mating operation comprises adjusting the dolly vehicle unit vertically to a height over ground which corresponds to a height over ground of the trailer unit, i.e., a height over ground which is suitable for mating.

The energy source 250 may be any of a battery, a super-capacitor, or a fuel cell. According to aspects, the energy source 250 may be placed in front of an electric axle of the electric machine 230, 230*l*, 230*r* or to the rear of an electric axle of the electric machine 230, 230*l*, 230*r*.

When the single axle dolly vehicle unit 130 is comprised in a vehicle combination 100 that also comprises a towing vehicle or truck 110, the single axle dolly vehicle unit may be controlled by the towing vehicle 110. In this case the single axle dolly vehicle unit 130 is operating in slave mode where it is controlled by a master control unit associated with the towing vehicle 110. According to one example, commands may be transmitted from the towing vehicle 110 to the single axle dolly vehicle 130 by a wired electrical communication interface. This wired electrical interface may be comprised in the electrical harness connection between truck and dolly vehicle unit. According to another example, commands may be transmitted from the towing vehicle 110 to the single axle dolly vehicle 130 by a wireless communication interface, such as a radio interface.

When the single axle dolly vehicle unit 130 is not comprised in a vehicle combination that also comprises a towing vehicle 110 or other master controller, control of the single axle dolly vehicle unit may be performed by using a manual control device comprised in the single axle dolly vehicle unit 130.

For efficient auto-coupling of the single axle dolly vehicle unit 130 to a first and second trailer unit 120, 140, it is advantageous if the dolly vehicle unit 130 can be controlled remotely. Therefore, the single axle dolly vehicle unit 130 may be arranged to be remote controlled via a wireless link 285 to a wireless device 280, as exemplified in FIGS. 2A and 2B. As an example, the wireless device 280 could be a remote control. As another example, the wireless device 280 could be a device capable of short-range communication e.g. via Bluetooth, such as a smartphone or tablet. Optionally, communication between the wireless device 280 and the single axle dolly vehicle unit 130 may be performed according to the 802.11 standard.

The single axle dolly vehicle unit 130 may also be arranged to be remote controlled via a wireless link 295 to a radio base station 290. For instance, the radio base station could be a base station arranged for mobile phone communication, such as a 4G or 5G base station. The base station 290 may then be connected to a core network providing access to data storage 291 or cloud services 292.

In cases where the single axle dolly vehicle unit 130 is controlled over 4G or 5G, or via Bluetooth, a software application or app suitable for a smartphone or tablet could be used as an interface for the person controlling the vehicle unit.

In order to allow for efficient auto-coupling, it is preferred that the single axle dolly vehicle unit 130 is steerable. This can be achieved by two separate electric machines 230*l*, 230*r* configured to drive the left and right wheel 210*l*, 210*r*. An example of a dolly vehicle unit 130 comprising such a propulsion arrangement is shown in FIG. 2A.

As an example, the electric machines 230*l*, 230*r* can be arranged to drive the respective left and right wheels 210*l*, 210*r* at different speeds, resulting in different torques T1, T2 around the axle 201 for the left and right wheel 210*l*, 210*r*. If the single axle dolly vehicle unit 130 is turning to the left, the right wheel 210*r* may be driven at a higher speed than the left wheel 210*l*, and vice versa. As another example, if the electric machines 230*l*, 230*r* are arranged for regenerative braking, said regenerative braking may be selectively applied to one of the left and right wheels 210*l*, 210*r* such that if the vehicle is turning to the left, braking is applied to the left wheel 210*l* and vice versa. The dolly vehicle unit 130, at least when supported by a swiveling wheel 260, can also be rotated on the spot by reversing one of the wheels and generating a forward drive motion by the other.

According to aspects, at least one electric machine 230, 230*l*, 230*r* may be an in-hub wheel motor. Such in-hub wheel motors may be realized as axial flux electric machines, which allow for a space saving design where a high power electric machine can be designed to fit inside the wheel hub.

As an alternative, friction brakes 220*l*, 220*r* on each wheel 210*l*, 210*r* may be arranged to steer the single axle dolly vehicle unit 130, possibly in combination with a differential drive 235. An example of a dolly vehicle unit 130 comprising such a propulsion arrangement is shown in FIG. 2B. With this type of propulsion arrangement, a torque T may be applied to drive both wheels through the differential drive 235. To steer the single axle dolly vehicle unit 130 braking is applied asymmetrically, so that if the single axle dolly vehicle unit 130 is turning to the left, braking is applied primarily to the left wheel 210*l* and vice versa. This results in different torques T1, T2 being applied to the left and right wheels 210*l*, 210*r*, causing the dolly vehicle unit 130 to turn.

As previously mentioned, the addition of a self-powered dolly vehicle unit such as the described single axle dolly vehicle unit 130, to a vehicle combination 100 can improve the maneuverability of the vehicle combination 100. The self-powered dolly vehicle unit can also be arranged to improve vehicle stability. For the single axle dolly vehicle unit 130, the control unit 240 may perform yaw stability control by torque vectoring. This entails using the steering capability of the single axle dolly vehicle unit 130 to ensure that the lateral acceleration on the vehicle unit does not exceed an acceptable value. The method is further described e.g. in WO2013066216A1.

According to aspects, the single axle dolly vehicle unit 130 may be any of an A-dolly type or a C-dolly type. There is also herein disclosed a vehicle combination 100 comprising a single axle dolly vehicle unit 130 as described above.

The self-powered single axle dolly vehicle unit 130, arranged to perform an auto-coupling procedure with a second trailer vehicle unit 140, can be used to automatically couple 400 and decouple 500 vehicle units 120, 130, 140 of a vehicle combination 100. Examples of such operations will now be described.

Figure 4A:
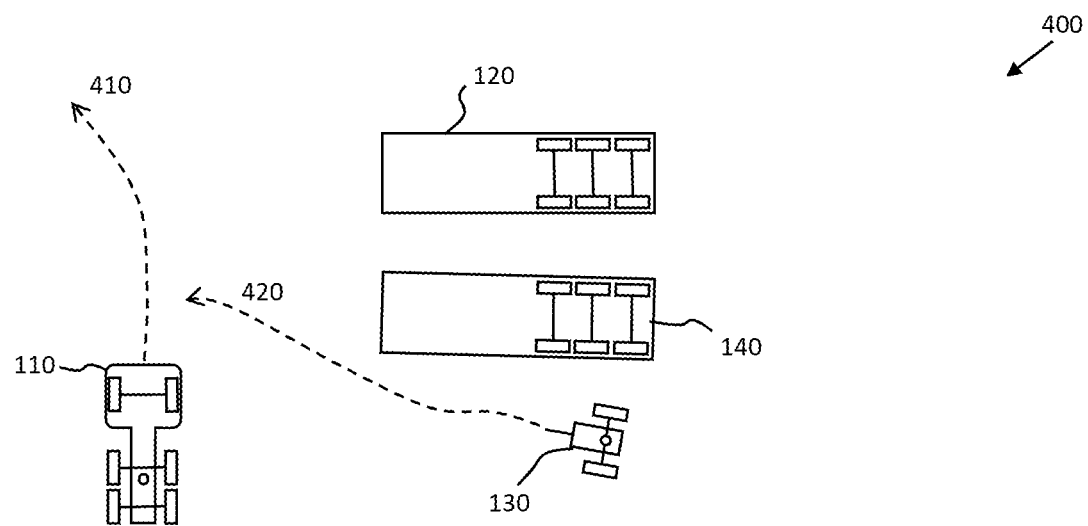
FIGS. 4A-C illustrates a coupling procedure involving a self-powered dolly vehicle unit.
Figure 4B:
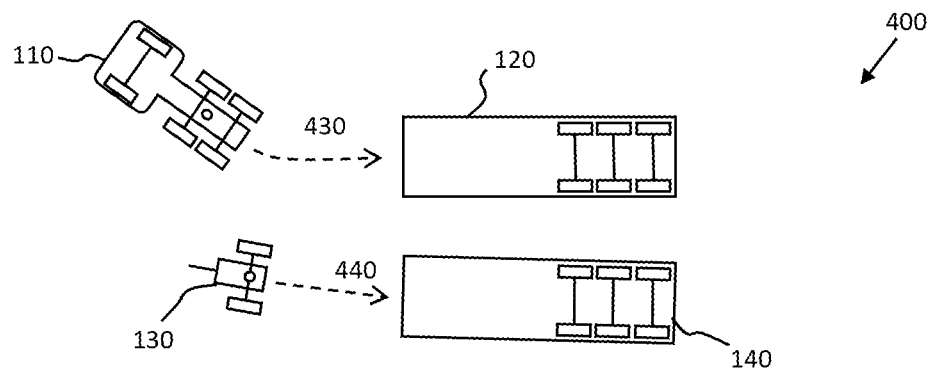
Figure 4C:
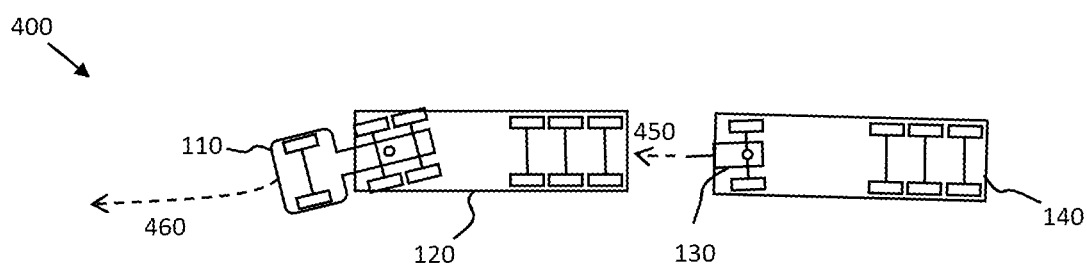

FIGS. 4A-C illustrates an example set of maneuvers comprised in a coupling procedure 400 using a self-powered dolly vehicle unit 130. FIG. 4A shows the towing vehicle 110 maneuvering 410 into position for mating with a first trailer 120, and the self-powered dolly vehicle unit 130 maneuvering 420 into position for mating with a second trailer unit 140. As mentioned above, a driver may control the towing vehicle 110 via normal control, and then control the dolly vehicle unit 130 using a wireless remote control. This remote control can be simplified if the dolly vehicle unit comprises a set of on-board cameras which feed a live video stream to a display unit arranged in the towing vehicle 110 or in connection to a remote control device, such as a smartphone or the like. In other words, according to some aspects, the dolly vehicle units 130 discussed herein comprise one or more camera units and a radio transceiver arranged to feed a live video stream to a remote location, where the live video stream can be used to facilitate a coupling procedure.

Generally, the dolly vehicle unit 130 may comprise any number of on-board vehicle sensors such as cameras, radars, lidars, wheel speed sensors, level sensors and the like. The data from these sensors can be transmitted to a remote control for facilitating remote control of the dolly vehicle unit 130. The data from one or more of these sensors can also be transmitted to a remote control unit, perhaps located in a towing vehicle or at a remote server. This remote control unit may then assume control of the dolly vehicle unit, and maneuver it into position for a coupling operation using the data from the sensors as guidance.

FIG. 4B shows the towing vehicle 110 mating 430 with the first trailer unit 120, e.g. by connecting a fifth wheel connection on the towing vehicle 110 to a kingpin on the first trailer 120. Also shown is a mating operation 440 where the fifth wheel connection of the self-powered dolly vehicle unit 130 is connected to the kingpin of the second trailer unit 140, which mating operation comprises detection of a trailer kingpin and a vertical height adjustment to match the height of the dolly vehicle unit fifth wheel connection to that of the kingpin. Finally, FIG. 4C shows the self-powered dolly vehicle unit 130 mating with the first trailer unit 120, e.g. by a drawbar 270. This operation comprises the dolly vehicle unit 130 maneuvering into position for mating, followed by a mating operation, which mating operation may also comprise vertical height adjustment by the dolly vehicle unit. The resulting vehicle combination can then depart 460.

Figure 7A:
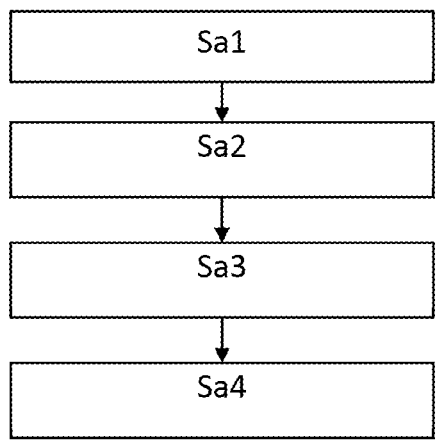
FIGS. 7A-B are flow charts illustrating methods.

FIG. 7A illustrates a method for coupling 400 vehicle units 110, 120, 130, 140 of a heavy-duty vehicle combination 100. The method comprises maneuvering Sa1, 420 a single axle self-powered dolly vehicle unit 130 into position for mating with a second trailer unit 140 by a fifth wheel connection 275. The method also comprises detecting Sa2, by a control unit 240 of the dolly vehicle unit 130, a height over ground of a kingpin of the second trailer unit 140. Furthermore, the method comprises adjusting Sa3, by the control unit 240, a height over ground h of the fifth wheel connection 275 to match the height over ground of the kingpin, and maneuvering Sa4 the dolly vehicle unit 130 to mate the fifth wheel connection to the kingpin.

The method may also comprise performing a pull-test of the coupling between fifth wheel connection and kingpin. A pull-test may comprise engaging the brakes on the second trailer unit 140, driving the dolly vehicle unit 130 forwards, and verifying that the coupling does not disengage.

The method may further comprise maneuvering 450 the single axle self-powered dolly vehicle unit 130 to mate a dolly vehicle unit drawbar 270 with a first trailer unit 120. Also, the method also comprise folding the supporting member 260 to folded position after mating.

Generally, the methods disclosed herein may comprise deactivating, i.e., retracting or folding away, the supporting member when the dolly vehicle unit is mated with a trailer unit by the fifth wheel connection 275 or by the drawbar, and activating the supporting member 260 when the dolly vehicle unit is not supported by a trailer unit.

FIGS. 5A-C illustrates an example set of maneuvers comprised in an example decoupling procedure 500 for a vehicle combination comprising a towing vehicle unit 110, a first and second trailer unit 120, 140 and a self-powered dolly vehicle unit 130. FIG. 5A shows the towing vehicle unit 110 maneuvering 520 the vehicle combination into position next to a building 510 or the like. The building 510 may for example be a warehouse with a loading bay or some type of goods depot. FIG. 5B shows the self-powered dolly vehicle unit 130 decoupling a drawbar 270 from the first trailer unit 120 and maneuvering 530 the second trailer unit 140 into a position near the building 510. FIG. 5C shows the self-powered dolly vehicle unit coupled to the first trailer unit 120 by a fifth wheel connection and maneuvering 540 the first trailer unit 120 into a position near the building 510.

Figure 7B:
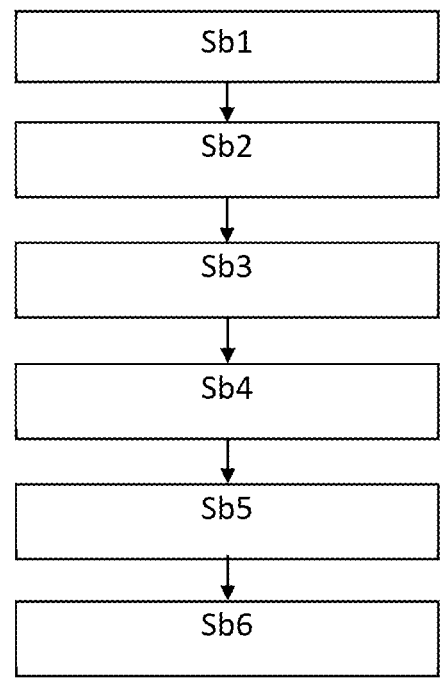

FIG. 7B illustrates a method for decoupling 500 vehicle units 110, 120, 130, 140 of a heavy-duty vehicle combination 100. The method comprises decoupling Sb1 a dolly vehicle unit drawbar 270 from a first trailer unit 120 and maneuvering Sb2, 530 a second trailer unit 140 to a parking position. The method also comprises decoupling Sb3 a fifth wheel connection of a dolly vehicle unit 130 from the second trailer unit 140 and maneuvering Sb4 the dolly vehicle unit 130 to coupling position with the first trailer 120. Furthermore, the method comprises coupling Sb5 the fifth wheel connection of the dolly vehicle unit 130 to the first trailer unit 120 and maneuvering Sb6, 540 the first trailer unit 120 to a parking position.

There is also herein disclosed a control unit 350 comprising processing circuitry 810 configured to perform a method as described above.

Figure 8:
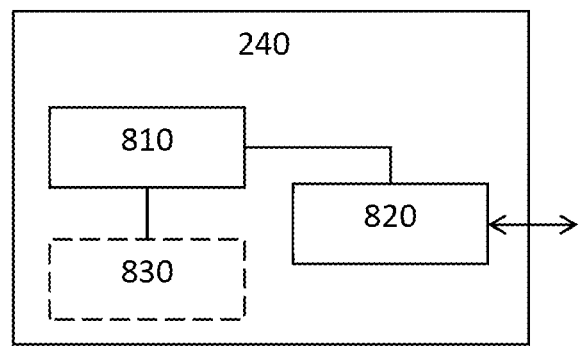
FIG. 8 schematically illustrates a control unit.

FIG. 8 schematically illustrates, in terms of a number of functional units, the components of a control unit 240 according to embodiments of the discussions and methods disclosed herein. This control unit 240 may be comprised in the vehicle 130, e.g., in the form of a vehicle motion management (VMM) unit configured to perform force allocation and the like. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 240 to perform a set of operations, or steps, such as the methods discussed in connection to FIGS. 7A and 7B. For example, the storage medium 830 may store the set of operations, and the processing circuitry 810 may be configured to retrieve the set of operations from the storage medium 830 to cause the control unit 240 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The control unit 240 may further comprise an interface 820 for communications with at least one external device, such as an electric machine or a gearbox. As such the interface 820 may comprise one or more transmitters and receivers, comprising analogue and digital components and a suitable number of ports for wireline or wireless communication.

The processing circuitry 810 controls the general operation of the control unit 240, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

Figure 9:
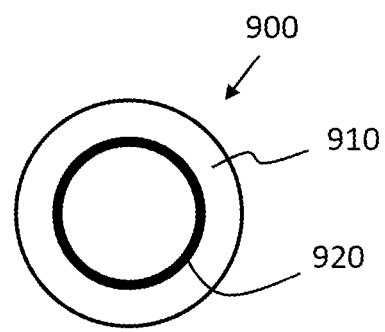
FIG. 9 shows an example computer program product.

FIG. 9 illustrates a computer readable medium 910 carrying a computer program comprising program code means 920 for performing, e.g., the methods illustrated in FIG. 7, when said program product is run on a computer. The computer readable medium and the code means may together form a computer program product 900.

The invention claimed is:

1. A single axle dolly vehicle unit for a heavy duty vehicle combination, the dolly vehicle unit comprising an electrical energy source arranged to power at least one electric machine configured to drive left and right wheels of the single axle, the dolly vehicle unit further comprising a drawbar and a fifth wheel connection for mating with first and second trailer units, respectively, wherein the fifth wheel connection is arranged to be adjusted in height over ground by a variable height suspension system, the dolly vehicle unit further comprising a control unit arranged to control the variable height suspension system in response to a control signal, wherein the control unit is arranged to perform an auto-coupling procedure with the second trailer unit for towing of the second trailer unit by the dolly vehicle, wherein the auto-coupling procedure comprises adjustment of the height over ground of the suspension system to mate the fifth wheel connection with a kingpin of the second trailer unit.

2. The single axle dolly vehicle unit according to claim 1, wherein the drawbar is supported by a supporting member arranged to be adjusted in height over ground by the control unit.

3. The single axle dolly vehicle unit according to claim 2, wherein the supporting member comprises a swiveling wheel or a fixed wheel on one end and a folding joint on an opposite end from the wheel, wherein the supporting member is arranged foldable about the folding joint.

4. The single axle dolly vehicle unit according to claim 1, wherein the control unit is arranged to detect a height over ground of the kingpin of the second trailer unit using an optical sensor.

5. The single axle dolly vehicle unit according to claim 1, wherein the control unit is arranged to detect the height over ground of the kingpin of the second trailer unit using a radar sensor.

6. The single axle dolly vehicle unit according to claim 1, wherein the control unit is arranged to obtain information indicative of the height over ground of the kingpin of the second trailer unit from a remote server or from an on-board memory device.

7. The single axle dolly vehicle unit according to claim 1, wherein the energy source is any of a battery, a supercapacitor, or a fuel cell.

8. The single axle dolly vehicle unit according to claim 1, wherein the energy source is placed in front of an electric axle of the electric machine.

9. The single axle dolly vehicle unit according to claim 1, wherein the energy source is placed to the rear of an electric axle of the electric machine.

10. The single axle dolly vehicle unit according to claim 1, wherein the single axle dolly vehicle unit is arranged to be remote controlled via a wireless link to a wireless device.

11. The single axle dolly vehicle unit according to claim 1, wherein the single axle dolly vehicle unit is arranged to be remote controlled via a wireless link to a radio base station.

12. The single axle dolly vehicle unit according to claim 1, wherein the control unit performs yaw stability control by torque vectoring.

13. The single axle dolly vehicle unit according to claim 1, wherein at least two separate electric machines configured to drive the left and right wheel are arranged to steer the single axle dolly vehicle unit.

14. The single axle dolly vehicle unit according to claim 1, wherein friction brakes on each wheel are arranged to steer the single axle dolly vehicle unit in combination with a differential drive.

15. The single axle dolly vehicle unit according to claim 1, wherein at least one electric machine is an in-hub wheel motor.

16. The single axle dolly vehicle unit according to claim 1, comprising one or more camera units and a radio transceiver arranged to feed a live video stream to a remote location.

17. A vehicle combination comprising a dolly vehicle unit according to claim 1.

18. A method for coupling vehicle units of a heavy-duty vehicle combination, comprising
   maneuvering a single axle self-powered dolly vehicle unit into position for mating with a second trailer unit by a fifth wheel connection,
   detecting, by a control unit of the dolly vehicle unit, a height over ground of a kingpin of the second trailer unit,
   adjusting, by the control unit, a height over ground of the fifth wheel connection to match the height over ground of the kingpin, wherein adjusting the height over ground is performed through controlling, by the control unit, a variable height suspension system, and
   maneuvering the dolly vehicle unit to mate the fifth wheel connection to the kingpin.

19. The method according to claim 18, comprising performing a pull-test of the coupling between fifth wheel connection and kingpin.

20. The method according to claim 18, comprising maneuvering a single axle dolly vehicle unit to mate a dolly vehicle unit drawbar with a first trailer unit.

21. The method according to claim 18, comprising folding a supporting member arranged to support the drawbar to folded position after mating.

22. A control unit comprising processing circuitry configured to perform a method according to claim 18.

* * * * *